(12) United States Patent
Suh (10) Patent No.: US 10,901,116 B2
(45) Date of Patent: Jan. 26, 2021

(54) DIFFERENTIAL ATTENUATION COMPENSATION FOR DISTRIBUTED TEMPERATURE SENSING SYSTEMS

(71) Applicant: Halliburton Energy Services, Inc., Houston, TX (US)

(72) Inventor: Kwang II Suh, Stevenson Ranch, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/339,508

(22) PCT Filed: Nov. 16, 2016

(86) PCT No.: PCT/US2016/062291
§ 371 (c)(1),
(2) Date: Apr. 4, 2019

(87) PCT Pub. No.: WO2018/093363
PCT Pub. Date: May 24, 2018

(65) Prior Publication Data
US 2020/0049853 A1     Feb. 13, 2020

(51) Int. Cl.
*G01J 5/02*     (2006.01)
*G01V 9/00*     (2006.01)
(Continued)

(52) U.S. Cl.
CPC ............. *G01V 9/005* (2013.01); *G01J 3/44* (2013.01); *G01K 11/32* (2013.01); *G01K 13/00* (2013.01)

(58) Field of Classification Search
CPC ........... G01V 9/005; G01J 3/44; G01K 11/32; G01K 13/00; G01K 2011/324; E21B 47/07

See application file for complete search history.

(56) References Cited

U.S. PATENT DOCUMENTS 4,714,829 A * 12/1987 Hartog ............... G01K 11/32
250/227.14
4,904,864 A * 2/1990 Dakin ............... G01D 5/268
250/226

(Continued)

OTHER PUBLICATIONS

International Patent Application No. PCT/US2016/062291, "International Search Report and Written Opinion", dated Aug. 8, 2017, 18 pages.

(Continued)

*Primary Examiner* — Kiho Kim
(74) *Attorney, Agent, or Firm* — Kilpatrick Townsend & Stockton LLP (57) ABSTRACT

An interrogation system includes lasers and an optical filtering device. The lasers include a primary set of lasers coupled to a primary multiplexer for generating primary light signals and a secondary set of lasers coupled to a secondary multiplexer for generating secondary light signals. The primary set of lasers may generate light signals having a first set of overlapping wavelengths and the secondary set of lasers may generate light signals having a second set of overlapping wavelengths. The optical filtering device may route the primary light signal and the secondary light signal to an optical fiber sensing cable positioned in a wellbore and receive reflection signals corresponding to the primary light signal and the secondary light signal. The reflection signals corresponding to the secondary light signal may have a first wavelength range that matches a second wavelength range of the primary light signals.

20 Claims, 5 Drawing Sheets

(51) Int. Cl.
*G01J 3/44* (2006.01)
*G01K 11/32* (2006.01)
*G01K 13/00* (2006.01)

(56) References Cited

U.S. PATENT DOCUMENTS

| | | | | |
|---|---|---|---|---|
| 5,191,458 | A * | 3/1993 | Lyons | H04B 10/071 398/144 |
| 5,513,913 | A * | 5/1996 | Ball | G01D 5/35383 250/227.14 |
| 5,696,863 | A * | 12/1997 | Kleinerman | F25B 23/003 250/227.11 |
| 7,668,411 | B2 | 2/2010 | Davies et al. | |
| 8,139,905 | B1 * | 3/2012 | Bazzone | G01K 11/3206 250/227.11 |
| 8,496,376 | B2 | 7/2013 | Lee et al. | |
| 8,630,514 | B2 * | 1/2014 | Mitchell | G01D 5/35387 385/12 |
| 9,025,157 | B2 * | 5/2015 | Wen | G01J 1/0407 356/477 |
| 9,488,531 | B2 | 11/2016 | Wysocki | |
| 9,772,238 | B2 * | 9/2017 | Preston | G01L 1/242 |
| 10,119,868 | B2 * | 11/2018 | Therrien | G01K 11/32 |
| 10,135,218 | B2 * | 11/2018 | Popovic | H04J 14/02 |
| 2010/0128756 | A1 * | 5/2010 | Lee | G01K 15/00 374/161 |
| 2013/0020486 | A1 * | 1/2013 | Zhang | G01K 11/32 250/349 |
| 2013/0167628 | A1 * | 7/2013 | Hull | E21B 47/117 73/152.58 |
| 2013/0208762 | A1 | 8/2013 | Mitchell et al. | |
| 2013/0301037 | A1 | 11/2013 | Handerek | |
| 2016/0377822 | A1 * | 12/2016 | Zheng | H01S 5/02453 385/14 |
| 2017/0010385 | A1 * | 1/2017 | Englich | G01D 5/35303 |
| 2018/0087976 | A1 * | 3/2018 | Sun | G01K 11/32 |
| 2018/0252596 | A1 * | 9/2018 | Braganza | G02B 6/4298 |

OTHER PUBLICATIONS

PCT Application No. PCT/US2016/062291, International Preliminary Report on Patentability, dated May 31, 2019, 15 pages.

* cited by examiner

DIFFERENTIAL ATTENUATION COMPENSATION FOR DISTRIBUTED TEMPERATURE SENSING SYSTEMS

TECHNICAL FIELD

The present disclosure relates generally to distributed temperature sensing and, more particularly (although not exclusively), to differential attenuation compensation for dual-wavelength distributed temperature sensing systems in wellbore environments.

BACKGROUND

Distributed Temperature Sensing (DTS) systems utilize fiber optic cable to obtain high-resolution temperature measurements in wellbore and other industrial environments. DTS-based measurements can use of an interrogation system to detect spontaneous Raman back-scattering. For example, a DTS system may launch a light signal into an optical sensing fiber coupled to a fiber optic distributed sensor positioned in a wellbore. The light signal may result in two back-scattered spectral components, a Stokes component and an anti-Stokes component. The Stokes component has a lower frequency and higher wavelength content than the launched light signal and the anti-Stokes signal has a higher frequency and lower wavelength than the launched light signal.

The anti-Stokes signal is temperature sensitive and the Stokes signal is temperature independent. A ratio of the two signals may be used to determine the temperature of the optical fiber at a particular point along the optical sensing fiber. As the Stokes and anti-Stoke signals travel, the signals can experience different attenuation profiles due to the difference in the wavelength band of the signals. For proper temperature measurement, a correction may be made to cause the signals to exhibit the same attenuation.

DETAILED DESCRIPTION

Certain aspects and examples of the present disclosure relate to distributed temperature sensing system configurations that compensate for attenuation in light signals traversing optical sensing fiber in a wellbore. Attenuation can be compensated by interrogating the optical fiber using light signals having a wavelength range that matches the wavelength range of the light signals reflected from the wellbore.

The optical sensing fiber may include optical fiber having one or more sensors for sensing temperature in a section of the wellbore. The sensors may be embedded or otherwise coupled the optical fiber or correspond to locations of the fiber itself. In one example, a distributed temperature sensing system has dual light sources for interrogating the optical sensing fiber. Each light source includes encompassing a set of lasers. The set of lasers may be coupled to a wavelength-division multiplexer (WDM) that generates a light signal by multiplexing a set of light signals generated by the set of lasers. The light signals of the set of multiplexed light signals may have different and overlapping wavelengths to create the wavelength range of the light signal routed to the optical sensing fiber. The reflection signal received from the optical sensing fiber may be routed to an optical detector for determining temperature in a section of the wellbore.

In some aspects, the wavelength ranges of the light signals generated by each light source of a distributed temperature sensing system may include primary and secondary light signals separated by the other's Stokes and anti-Stokes wavelength. For example, the light signals generated by each light source may traverse the optical sensing fiber with the primary light signal's outgoing wavelength matching the secondary light signal's returning Stokes wavelength. Similarly, the secondary light signal's outgoing wavelength may match the primary light signal's anti-Stokes wavelength. The wavelength wavelength range of the light sources may compensate for the small differences in differential attenuation between the light signals generated by the light sources. The differential attenuation may correspond to differences in the loss of power as each of the light signal traverses the optical sensing fiber.

A distributed temperature sensing system according to some aspects of the present disclosure allow for accurate temperature measurements for any attenuation profile of the optical sensing fiber of the system. For example, the attenuation profile of the fiber may include multiple changes at different locations of the fiber. The profile changes may cause a difference in the bandwidth between the light signal routed to the optical sensing fiber and the reflected light signal that results in corresponding differences in the total attenuation between the corresponding light signals reflected back from the optical sensing fiber. The reflected light signals are routed to an optical detector for determining temperature in the wellbore. But, differences in the attenuation between the reflected light signals may cause varying temperature measurements.

In one example, the differences in attenuation may be caused by extreme changes in temperature in the environment surrounding the optical sensing fiber. For example, optical sensing fiber positioned in a wellbore may experience extreme temperatures when steam is injected into the wellbore to melt heavy oils in the wellbore. As the steam penetrates the fiber, it may lose power, or darken. The darkening of the optical sensing fiber may change the attenuation profile, which can affect the differential attenuation of the reflected light signals traversing the fiber. But, the differences in the wavelengths of the light signals used to generate the source light signals of the distributed temperature sensing system may be wavelength enough to account for the differences in the total attenuation between the reflected light signals.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
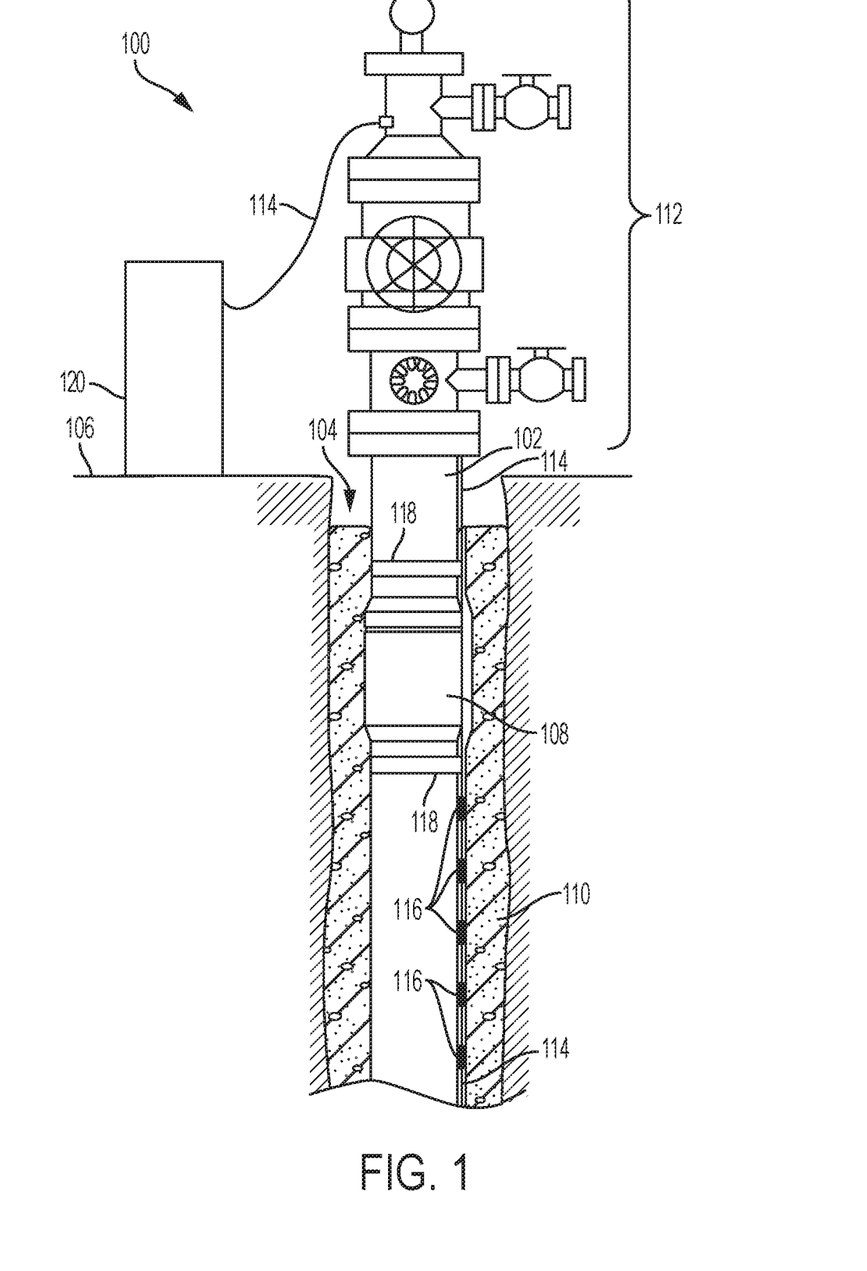
FIG. 1 is a cross-sectional schematic diagram depicting an example of a wellbore environment including a distributed temperature sensing system according to one aspect of the present disclosure.

Various aspects of the present disclosure may be implemented in various environments. FIG. 1 illustrates an example of a wellbore environment 100 that includes a distributed temperature sensing system according to some aspects of the present disclosure. The wellbore environment 100 includes a casing string 102 positioned in a wellbore 104 that has been formed in a surface 106 of the earth. The wellbore environment 100 may have been constructed and completed in any suitable manner, such as by use of a drilling assembly having a drill bit for creating the wellbore 104. The casing string 102 may include tubular casing sections connected by end-to-end couplings 108. In some aspects, the casing string 102 may be made of a suitable material such as steel. Within the wellbore 104, cement 110 may be injected and allowed to set between an outer surface of the casing string 102 and an inner surface of the wellbore 104. At the surface 106 of the wellbore 104, a tree assembly may be joined to the casing string 102. The tree assembly 112 may include an assembly of valves, spools, fittings, etc. to direct and control the flow of fluid (e.g., oil, gas, water, etc.) into or out of the wellbore 104 within the casing string 102.

Optical fiber cables 114 may be routed through one or more ports in the tree assembly 112 and extend along an outer surface of the casing string 102. The optical fiber cables 114 may include one or more optical sensors 116 along the optical fiber cables 114. The sensors 116 may be embedded in the optical fiber cables 114 or otherwise coupled to the optical fiber cables 114 to create an optical fiber sensing cable. The optical fiber cables 114 and the sensors 116 may be deployed in the wellbore 104 and used to sense and transmit measurements of temperature conditions in various sections of the wellbore 104 to the surface 106. The optical fiber cables 114 may be retained against the outer surface of the casing string 102 at intervals by coupling bands 118 that extend around the casing string 102. In FIG. 1, the optical fiber cables 114 are retained by two coupling bands 118 installed on either side of the couplings 108.

The optical fiber cables 114 can be coupled to an interrogation subsystem 120 of the distributed temperature sensing system. The interrogation subsystem 120 is positioned at the surface 106 of the wellbore 104. In some aspects, the interrogation subsystem 120 may be an opto-electronic unit that may include devices and components to interrogate the sensors 116 coupled to the optical fiber cables 114. For example, the interrogation subsystem 120 may include light sources, such as laser devices, that can generate light signals to be transmitted through one or more of the optical fiber cables 114 to the sensors 116 in the wellbore 104. The interrogation subsystem 120 may also include a detector device to receive and perform interferometric measurements of reflected light from the sensors 116 coupled to the optical fiber cables 114.

Figure 2:
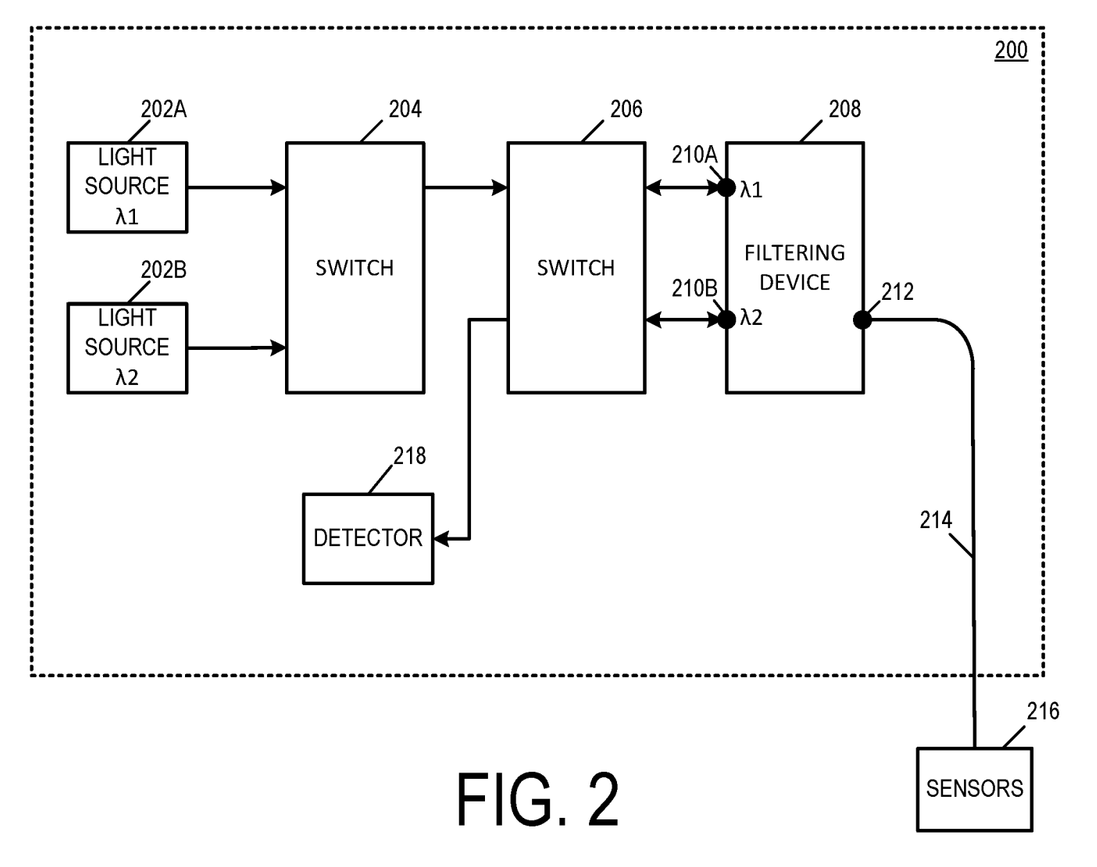
FIG. 2 is a schematic diagram of an example of a distributed temperature sensing system according to one aspect of the present disclosure.

FIG. 2 is a schematic diagram of an example of a distributed temperature sensing system according to one aspect of the present disclosure. The distributed temperature sensing system includes an interrogation system 200. In some aspects, the interrogation system 200 of FIG. 2 represents one configuration of the interrogation subsystem 120 of FIG. 1, but other configurations are possible. For example, the components of the distributed temperature sensing system may be arranged in a different order or configuration without departing from the scope of the present disclosure. Similarly, one or more components may be added to or subtracted from the configuration of the distributed temperature sensing system shown in FIG. 2 without departing from the scope of the present disclosure.

The interrogation system 200 includes two light sources 202A, 202B. Each light source 202A, 202B may be configured to generate light signals. The light sources 202A, 202B each include multiple light-generating devices. Non-limiting examples of the light-generating devices of the light sources 202A, 202B include laser devices, light-emitting diodes, or other optical transmitters for generating and emitting the light signals. In some aspects, the light sources 202A, 202B may also include additional devices, including, but not limited to a pulse generator and a wavelength-division multiplexer. The pulse generators may manipulate or modulate the light signals emitted from the light sources 202A, 202B such that the lights signals are emitted as pulses. The wavelength-division multiplexer may multiplex or otherwise combine multiple light signals generated by the light-generating devices of the light sources 202A, 202B to generate a single light signal emitted from the light sources 202A, 202B. Though two light sources 202A, 202B are shown in FIG. 2, in some aspects, the interrogation system 200 may include three or more light sources without departing from the scope of the present disclosure.

The light sources 202A, 202B are communicatively coupled to optical switches 204, 206. In some aspects, the optical switches 204, 206 may include circuitry for receiving multiple light signals at input ports and selecting which light signal to route through an output port. The optical switches 204, 206 may be optically transparent. For example, the optical switches 204, 206 may operate in a passband wavelength range to allow light signals to be routed through the optical switches 204, 206 without being scattered. In additional and alternative aspects, the optical switches 204, 206 may be passive. For example, the optical switches 204, 206 may not include any gain elements between the input and the output of the switches 204, 206. In further aspects, the optical switches 204, 206 may be unidirectional switches or bi-directional switches. For example, optical switch 204 may be a unidirectional switch configured to route light signals in a single direction. The optical switch 204 may receive a light signal from the light source 202A at an input port communicatively coupled to the light source 202A and route the light signal through an output port to the optical switch 206. Similarly, the optical switch 204 may receive a light signal from the light source 202B at an input port communicatively coupled to the light source 202B and route the light signal through an output port to the optical switch 206. In a further example, the optical switch 206 may be a bi-directional switch capable of routing light signals in either direction (e.g., one or more ports operating as both an input port and an output port to light signals). For example, optical switch 206 may include bi-directional ports coupled to a filtering device 208 and may both route light signals to the filtering device 208 and receive light signals from the filtering device 208.

The filtering device 208 may include one or more filters. In some aspects, one or more filters of the filtering device 208 may be thin-film filters. The filtering device includes at least three bi-directional ports. Ports 210A, 210B are coupled to the optical switches 204, 206 for transmitting light signals between the optical switch 206 and the filtering device 208. In some aspects the ports 210A, 210B may be designated ports for receiving light signals from the light source 202A, 202B, respectively. Port 212 is a common port coupled to an optical fiber cable 214. The optical fiber cable 214 is coupled to one or more sensors 216 to create an optical fiber sensing cable. In some aspects, the sensors 216 are embedded in the optical fiber cable 214. The sensors 216 and at least a portion of the optical fiber cable 214 may be positioned in a wellbore (e.g., wellbore 104 of FIG. 1) to sense temperature downhole in the wellbore in sections of the wellbore where the optical fiber cable 214 or sensors 216 are located.

During operation of the interrogation system 200, the light sources 202A, 202B each generate a light signal for interrogating the optical fiber cable 214 and sensors 216 positioned in a wellbore. In some aspects, the light sources 202A, 202B may be operable to generate light signals having different wavelengths. For example, the light signals generated by the light source 202A may have a wavelength $\lambda 1$ and the light signals generated by the light source 202B may have a wavelength $\lambda 2$. In some aspects, the wavelengths $\lambda 1$ and $\lambda 2$ are separated by the other's Stokes and anti-Stokes wavelength. The separation causes the light signals generated by the light source 202A to have a wavelength that match the Stokes wavelength of the reflected light signals of the light signals generated by the light source 202B, reflected from the optical fiber cable 214 and sensors 216. The separation also causes the light signals generated by the light source 202B to have a wavelength that matches the anti-Stokes wavelength of the reflected light signals of the light signals generated by the light source 202A, reflected from the optical fiber cable 214 and sensors 216.

The light signals generated by the light sources 202A, 202B are routed to the optical switch 204. The optical switch 204 selectively routes one of the light signals to the optical switch 206. In some aspects, the optical switch 204 may be configured to alternate which light signal to route to the optical switch 206. For example, the optical switch 204 may be coupled to a control device, timer, processor, or other means for determining which light signal to route to the optical switch 206. The optical switch 206 routes the received light signal to port 210A or port 210B depending on which light signal is being routed through the optical switch 206. For example, the optical switch 206 may route a light signal generated by the light source 202A to the port 210A in response to receiving the light signal from the optical switch 204. Similarly, the optical switch 206 may route a light signal generated by the light source 202B to the port 210B in response to receiving the light signal from the optical switch 204.

The filtering device 208 may route the light signals received at port 210A or port 210B to the optical fiber cable 214 for interrogating the sensors 216 via port 212. In some aspects, the filtering device 208 may filter the light signals routed through the filtering device 208 prior to routing the light signals to the optical fiber cable 214. For example, the filtering device 208 may be tuned to only route light signals within a certain bandwidth or wavelength range. In some aspects, the filtering device 208 may be tunable to adjust the bandwidth of the light signals routed through the filtering device 208. In this manner, the filtering device 208 may operate together with, or separate from, the light sources 202A, 202B to ensure that reflection signals corresponding to one of the light source's 202A, 202B light signal is in a wavelength range that matches the wavelength range of the other light source's 202A, 202B generated light signal.

In response to routing a light signal to the optical fiber cable 214 through port 212, the filtering device 208 may receive a reflected light signal corresponding to the light signal at the port 212. The filtering device 208 may route the reflected signal to the optical switch 206 via the port 210A, 210B that was not used to receive the light signal from the optical switch 206. For example, the filtering device 208 may route a reflected signal corresponding to the light signal generated by light source 202A to the optical switch 206 through port 210B when the light signal was received via port 210A. Similarly, the filtering device 208 may route a reflected signal corresponding to the light signal generated by light source 202B to the optical switch 206 through port 210A when the light signal was received via port 210B.

The optical switch 206 may route the reflected signal to an optical detector 218. In some aspects, the optical detector 218 includes an optical receiver an opto-electrical devices having one or more photodetectors to convert light signals into electricity using a photoelectric effect. In further aspects, the photodetectors include photodiodes to absorb photons of the light signals and convert the light signals into an electrical current. The electrical current may be converted to electrical voltage and routed to a computing device for analyzing the light signals to determine a temperature at a location in the wellbore. Although one optical detector 218 is shown in FIG. 2, in other examples more than one optical detector 218 is used for detecting reflected light signals from the optical fiber cable 214 and sensors 216.

Figure 3:
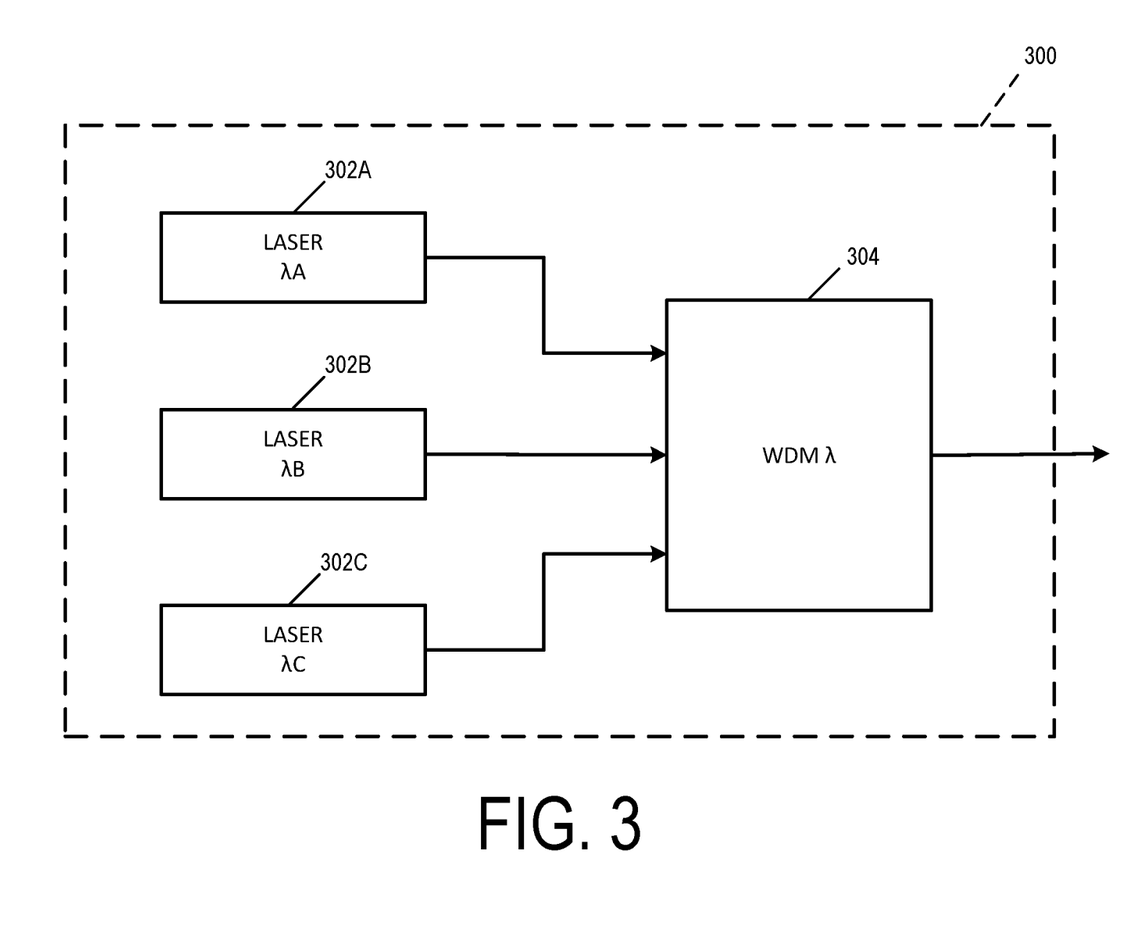
FIG. 3 is a block diagram of an example of a light source for the distributed temperature sensing system of FIG. 2 according to one aspect of the present disclosure.

FIG. 3 is a block diagram of an example of a light source 300 for the distributed temperature sensing system of FIG. 2 according to one aspect of the present disclosure. In some aspects, the light source 300 may replace light source 202A or light source 202B, or both, in the interrogation system of FIG. 2. The light source includes lasers 302A, 302B, 302C coupled to a wavelength-division multiplexer 304. Each of the lasers 302A, 302B, 302C is operable to generate light signals at different wavelengths, $\lambda A$, $\lambda B$, and $\lambda C$, respectively. The wavelengths $\lambda A$, $\lambda B$, $\lambda C$ of the generated light signals may also overlap with the wavelength of at least one other light signal. The light signals generated by the lasers 302A, 302B, 302C may be routed to the wavelength-division multiplexer 304 and multiplexed into a single light signal that traversing the components of the interrogation system in a wavelength range corresponding to the overlapping wavelengths $\lambda A$, $\lambda B$, $\lambda C$. Although three lasers 302A, 302B, 302C are shown in the light source 300, the lasers 302A, 302B, 302C may be two lasers or four or more lasers without departing from the scope of the present disclosure. Similarly, although lasers are described, the light source may include a set of any light-generating devices to generate light signals having wavelengths $\lambda A$, $\lambda B$, $\lambda C$.

Figure 4:
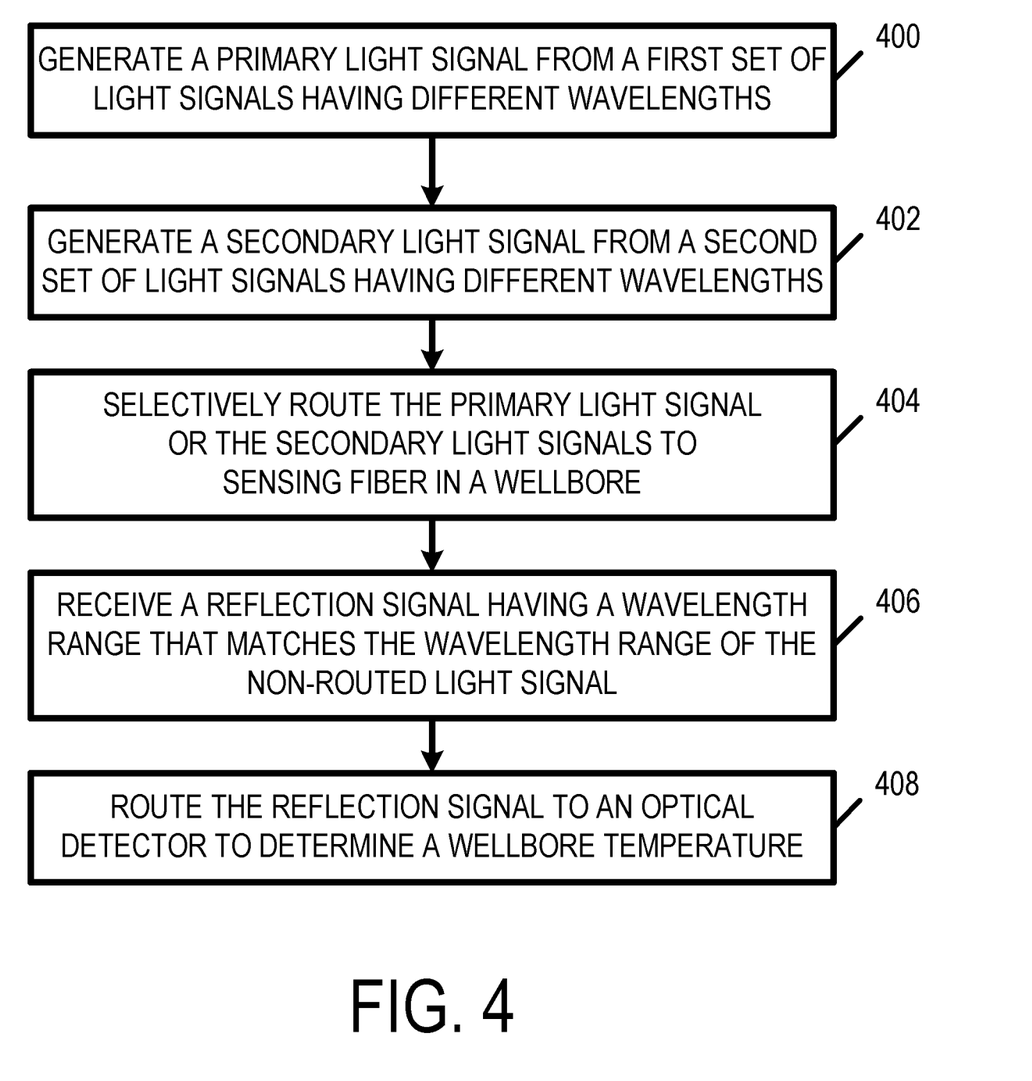
FIG. 4 is a flow chart of a process for compensating for differential attenuation in a distributed temperature sensing system according to one aspect of the present disclosure.

FIG. 4 is a flow chart of an example of a process for compensating for differential attenuation in a distributed temperature sensing system according to one aspect of the present disclosure. The process is described with respect to the components described in FIGS. 1-3, though other implementations are possible without departing from the scope of the present disclosure.

In block 400, a primary light signal is generated from a first set of light signals having different wavelengths. In some aspects, the primary light signal may correspond to a light signal generated by the light source 202A. The light source may include multiple lasers 302A, 302B, 302C or other light-generating devices as described in FIG. 3. For example, the multiple lasers generate a set of light signals having different wavelengths. The wavelengths may be overlapping such that at least reaches another of the wavelengths. A wavelength-division multiplexer of the light source 202A may receive the set of light signals and generate the primary light signal.

In block 402, a secondary light signal is generated from a second set of light signals having different wavelengths. In some aspects, the secondary light signal may correspond to a light signal generated by the light source 202B. Similar to the primary light source (e.g., light source 202A), the secondary light source may include multiple light-generating devices operable at different, overlapping wavelengths and multiplexed to generate the secondary light source as described in FIG. 3.

In block 404, the primary light signal or the secondary light signal is selectively routed to optical sensing fiber cable extending into a wellbore (e.g., wellbore 104 of FIG. 1). In some aspects, the primary light signal or secondary light signal may be selected by optical switch 204 and routed to the optical fiber cable 214 and sensors 216. For example, the optical switch 204 may receive the primary light signal and secondary light signal as inputs and select one to route toward the optical fiber cable 214. In some aspects, the optical switch 204 may alternate which light signal to route. In other aspects, the optical switch 204 may be manually or automatically controlled by a control device which determines which light signal to route. In some aspects, routing the primary light signal or the secondary light signal to the optical fiber cable 214 and sensors 216 may also include tuning the routed light signal. For example, as the light signal is routed through the filtering device 208 to the optical fiber cable 214 coupled to the filtering device 208, the filtering device 208 may have an adjustable bandwidth that may tune the light signals passing through to cause the primary light signals and the reflection signals of the secondary light signals to have matching wavelength ranges. The filtering device 208 may also tune the light signals to cause the secondary light signals and the reflection signals of the primary light signals to have matching wavelength ranges.

In block 406, a reflection signal is received. The reflection signal may include a wavelength range that matches the wavelength range of the non-routed light signal (e.g., the reflection signal corresponding to the primary light signal when the optical switch 204 select the primary light signal to route downhole as described in block 404). The wavelength range of the non-routed light signal may be determined based on the overlapping wavelengths of the light signals multiplexed to generate the non-routed light signal. For example, in response to the optical switch 204 selecting the secondary light signal to route to the optical fiber cable 214, the secondary light signal may be routed by the optical switch 204 to the optical switch 206, which in turn routes the secondary light signal to the filtering device 208. The filtering device 208 may route the secondary light signal and in response, receive a reflection signal generated by the sensors 216 of the optical fiber cable 214 and route the reflection signal to the sensors 216. The wavelength range of the reflection signal may match the wavelength range of the primary light signal. In some aspects, the wavelength of the reflection signal may correspond to the Stokes or anti-Stokes wavelength of the primary light signal.

In block 408, the reflection signal is routed to the optical detector 218 to determine a temperature in a section of the wellbore 104. In some aspects, the reflection signal is routed to the optical detector 218 by the optical switch 206.

Figure 5:
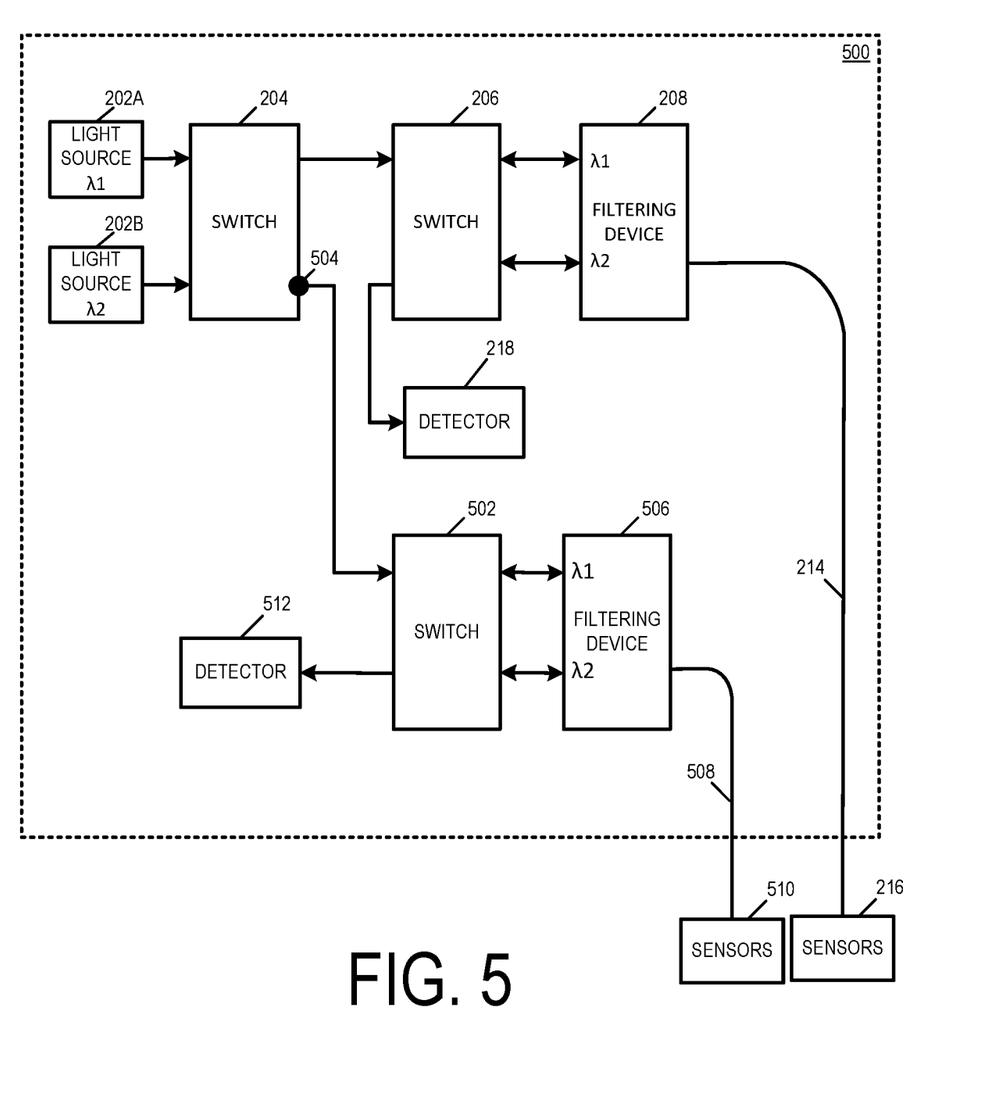
FIG. 5 is a block diagram of an example of a distributed temperature sensing system for simultaneous temperature measurements on two separate fibers according to one aspect of the present disclosure.

FIG. 5 is a distributed temperature sensing system 500 for simultaneous temperature measurements on two separate fibers according to one aspect of the present disclosure. The distributed temperature sensing system 500 encompasses the interrogation system 200 of FIG. 2 but expands the interrogation system 200 to include additional components. For example, the distributed temperature sensing system 500 includes the light source 202A, 202B communicatively coupled to the optical switches 204, 206 and the filtering device 208 for routing light signals generated by the light source 202A, 202B to interrogate optical fiber cable 214 and sensors 216 positioned in a wellbore as described in FIG. 2.

The distributed temperature sensing system 500 also includes an additional optical switch 502 communicatively coupled to the optical switch 204 of the interrogation system 200 of FIG. 2. The optical switch 502 is coupled to the optical switch 204 at port 504. During operation of the interrogation system 200 of FIG. 2, port 504 of the optical switch 204 is unused. The distributed temperature sensing system 500 of FIG. 5 uses port 504 allow the optical switch 204 to simultaneously route both light signals generated by the light sources 202A, 202B through the optical switch 204 for determining temperature measurements in a wellbore. For example, the optical switch 204 may be configured to route the light signal generated by light source 202A to the optical switch 206 for interrogating the optical fiber cable 214 and sensors 216 as described herein. The optical switch 204 may simultaneously route the light signal generated by the light source 202B to the optical switch 502. The optical switch 502 may route the light signal to a filtering device 506 for interrogating a second optical fiber cable 508 and sensors 510 coupled to the filtering device 506 and positioned in the wellbore. The optical switch 502 and the filtering device 506 may be of a similar type and operate similarly to the optical switch 206 and the filtering device 208.

The filtering device 506 may receive a reflection signal corresponding to the signal routed by the filtering device to the optical fiber cable 508 and route the reflection signal to the optical switch 502. The optical switch may route the reflection signal to a detector 512. The detector 512 may be similar in type and operation as the optical detector 218 of FIG. 2. The reflection signal is routed to the detector 512 to determine a temperature in a section of a wellbore corresponding to the location of the sensors 510.

In some aspects, the sensors 216, 510 may be positioned in different sections of the wellbore to simultaneously determine temperature measurements in both sections of the wellbore using the same light sources 202A, 202B. In other aspects, the sensors 216, 510 may be included on optical fiber cables 214, 508, respectively, that extend into different wellbores for obtaining temperature measurements in both wellbores simultaneously.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:
1. An interrogation system, comprising:
    a plurality of lasers including a primary set of lasers coupled to a primary multiplexer for generating primary light signals that have a first set of overlapping wavelengths and a secondary set of lasers coupled to a secondary multiplexer for generating secondary light signals that have a second set of overlapping wavelengths; and an optical filtering device communicatively couplable to the plurality of lasers to route the primary light signals to an optical fiber sensing cable positioned in a wellbore and route the secondary light signals to the optical fiber sensing cable separate from the primary light signals, the optical filtering device including a common port couplable to the optical fiber sensing cable to receive reflection signals corresponding to the primary light signals and reflection signals corresponding to the secondary light signals, wherein the reflection signals corresponding to the secondary light signals have a wavelength range that matches the wavelength range of the primary light signals.

2. The interrogation system of claim 1, wherein the reflection signals corresponding to the primary light signals have a second wavelength range that matches the wavelength range of the secondary light signals, the second wavelength range being different than the wavelength range of the secondary light signals.

3. The interrogation system of claim 1, wherein the primary light signals and the reflection signals corresponding to the secondary light signals include a Raman anti-Stokes wavelength.

4. The interrogation system of claim 1, wherein the secondary light signals and the reflection signals corresponding to the secondary light signals include a Roman Stokes wavelength.

5. The interrogation system of claim 1, further comprising the primary multiplexer and the secondary multiplexer,
wherein the primary multiplexer is couplable to the primary set of lasers to generate the primary light signals such that the primary light signals and the reflection signals of the secondary light signals to have matching wavelength ranges, and
wherein the secondary multiplexer is couplable to the secondary set of lasers to generate the secondary light signals such that the secondary light signals and the reflection signals of the primary light signals have matching wavelength ranges.

6. The interrogation system of claim 1, wherein the optical filtering device includes a bandwidth that is adjustable to cause the primary light signals and the reflection signals of the secondary light signals to have matching wavelength ranges.

7. The interrogation system of claim 1, further including optical switches positionable between the plurality of lasers and the optical filtering device to selectively route the primary light signal or the secondary light signal from the primary multiplexer or the secondary multiplexer to the optical filtering device,
wherein the optical switches include at least one switch communicatively couplable to an optical detector for routing the reflection signals corresponding to the primary light signals or the secondary light signals to the optical detector.

8. The interrogation system of claim 1, further comprising:
an optical switch positionable between the plurality of lasers and an additional optical filtering device to route the primary light signal or the secondary light signal to an additional optical sensing fiber cable that extends into the wellbore; and
a set of optical switches separate from the optical switch and positionable between the plurality of lasers and the optical filtering device, wherein one switch of the set of optical switches is communicatively coupled to the optical switch to simultaneously route the primary light signal to the optical switch and the secondary light signal to a second switch of the set of optical switches.

9. A method, comprising:
generating a primary light signal that has a first set of overlapping wavelengths;
generating a secondary light signal that has a second set of overlapping wavelengths;
routing, based on a selection of an optical switch, the primary light signal or the secondary light signal to an optical fiber sensing cable extending downhole into a wellbore;
receiving, from the optical fiber sensing cable, a reflection signal corresponding to a reflection of the primary light signal or the secondary light signal that is a routed light signal, the reflection signal having a first wavelength range that matches a second wavelength range of the other of the primary light signal or the secondary light signal that is a non-routed light signal; and
routing the reflection signal to an optical detector to determine a temperature in a section of the wellbore.

10. The method of claim 9, further comprising:
separately routing the non-routed light signal to the optical fiber sensing cable; and
receiving, from the optical fiber sensing cable, a second reflection signal corresponding to a reflection of the non-routed light signal, the second reflection signal having a third wavelength range that matches a fourth wavelength range of the routed light signal.

11. The method of claim 10, wherein the non-routed light signal and the second reflection signal include a Raman Stokes or a Raman anti-Stokes wavelength.

12. The method of claim 9, wherein the routed light signal and the reflection signal include a Raman Stokes or a Raman anti-Stokes wavelength.

13. The method of claim 9, further comprising:
adjusting a filtering device coupled to the optical fiber sensing cable to cause the first wavelength range and the second wavelength range to correspond.

14. The method of claim 9, wherein selectively routing the primary light signal or the secondary light signal to the optical fiber sensing cable includes simultaneously routing a non-selected light signal to a second optical fiber sensing cable, the non-selected light signal corresponding to one of the primary light signal or the secondary light signal that was not selectively routed to the optical fiber sensing cable.

15. The method of claim 14, further comprising:
receiving, from the second optical fiber sensing cable, a second reflection signal corresponding to a reflection of the non-selected light signal; and
routing the reflection signal to a second optical detector to determine a temperature in one of a different section of the wellbore or a different wellbore.

16. A distributed temperature sensing system, comprising:
an optical fiber sensing cable extending downhole in a wellbore, the optical fiber sensing cable including an optical fiber cable having one or more sensors for sensing temperature in a section of the wellbore; and
one or more optical switches positioned in an optical path between two or more light sources and the optical fiber sensing cable to route a primary light signal to the optical fiber sensing cable and a secondary light signal to the optical fiber sensing cable separate from the primary light signal, the primary light signal corresponding to a first multiplexed signal having a first wavelength range and the secondary light signal corresponding to a second multiplexed signal having a second wavelength range, wherein the optical fiber sensing cable is positioned at an end of the optical path to receive the secondary light signal from the one or more optical switches and route a reflection signal corresponding to a reflection of the secondary light signal toward the one or more optical switches, the reflection signal having a wavelength range that matches the first wavelength range.

17. The distributed temperature sensing system of claim 16, further comprising a first set of lasers for generating a first set of light signals having overlapping wavelengths that define the first wavelength range and a second set of lasers for generating a second set of light signals having overlapping wavelengths that define the second wavelength range.

18. The distributed temperature sensing system of claim 16, further comprising an optical filtering device having a common port coupled to the optical fiber sensing cable to route the secondary light signal to the optical fiber sensing cable and receive the reflection signal from the optical fiber sensing cable, the optical filtering device being positioned in the optical path between the one or more optical switches and the optical fiber sensing cable.

19. The distributed temperature sensing system of claim 18, wherein one switch of the one or more optical switches is coupled to the optical filtering device at bi-directional ports of the optical filtering device, the bi-directional ports including a first dedicated port for receiving the primary light signal from the one switch and a second dedicated port for receiving the secondary light signal from the one switch, wherein the optical filtering device is operable to route the reflection signal corresponding to the reflection of the secondary light signal to the one switch through the first dedicated port and a second reflection signal corresponding to a reflection of the primary light signal to the one switch through the second dedicated port.

20. The distributed temperature sensing system of claim 18, wherein one switch of the one or more optical switches is communicatively coupled to both the optical fiber sensing cable and a second optical fiber sensing cable for simultaneously routing the primary light signal to the optical fiber sensing cable and the secondary light signal to the second optical fiber sensing cable.

\* \* \* \* \*